United States Patent [19]

Lestradet

[11] 4,202,498

[45] May 13, 1980

[54] LIQUID DISTRIBUTING APPARATUS AND IN PARTICULAR A FERTILIZER OR INSECTICIDE SPRAYER

[76] Inventor: Maurice C. J. Lestradet, 291, Avenue du Marechal-Delattre-de-Tassigny, 51230 Fere-Champenoise, France

[21] Appl. No.: 826,815

[22] Filed: Aug. 22, 1977

[30] Foreign Application Priority Data

Aug. 31, 1976 [FR] France ............................ 76 26203

[51] Int. Cl.² .............................................. B05B 9/06
[52] U.S. Cl. ................................................ 239/156
[58] Field of Search .................. 239/67, 71, 72, 155, 239/156

[56] References Cited

U.S. PATENT DOCUMENTS

| | | | |
|---|---|---|---|
| 3,356,261 | 12/1967 | Stein | 239/156 X |
| 3,782,634 | 1/1974 | Herman | 239/156 |
| 3,877,645 | 4/1975 | Oligschlaeger | 239/155 |
| 4,052,003 | 10/1977 | Steffen | 239/155 X |
| 4,083,494 | 4/1978 | Ballu | 239/156 |

*Primary Examiner*—Robert W. Saifer
*Attorney, Agent, or Firm*—Sherman Levy

[57] ABSTRACT

The invention relates to a mobile liquid distributing apparatus comprising a quasi-constant flow supply device a variable flow distributing device, and liquid transfer means interconnecting the two devices. A flow regulating means is included in the transfer means and a regulation device acts on the regulating means and comprises comparison means. The latter receive, on one hand, a signal from means for measuring a magnitude which is a characteristic of the flow of the liquid in the transfer means and, on the other hand, a reference signal from means for measuring the speed of the apparatus through means for transforming between the speed and said magnitude. The means measuring the characteristic magnitude is constituted by a flow measuring means and the transforming means are constituted by means for applying a coefficient of proportionality. The invention is of particular interest in applications in the agricultural field.

2 Claims, 1 Drawing Figure

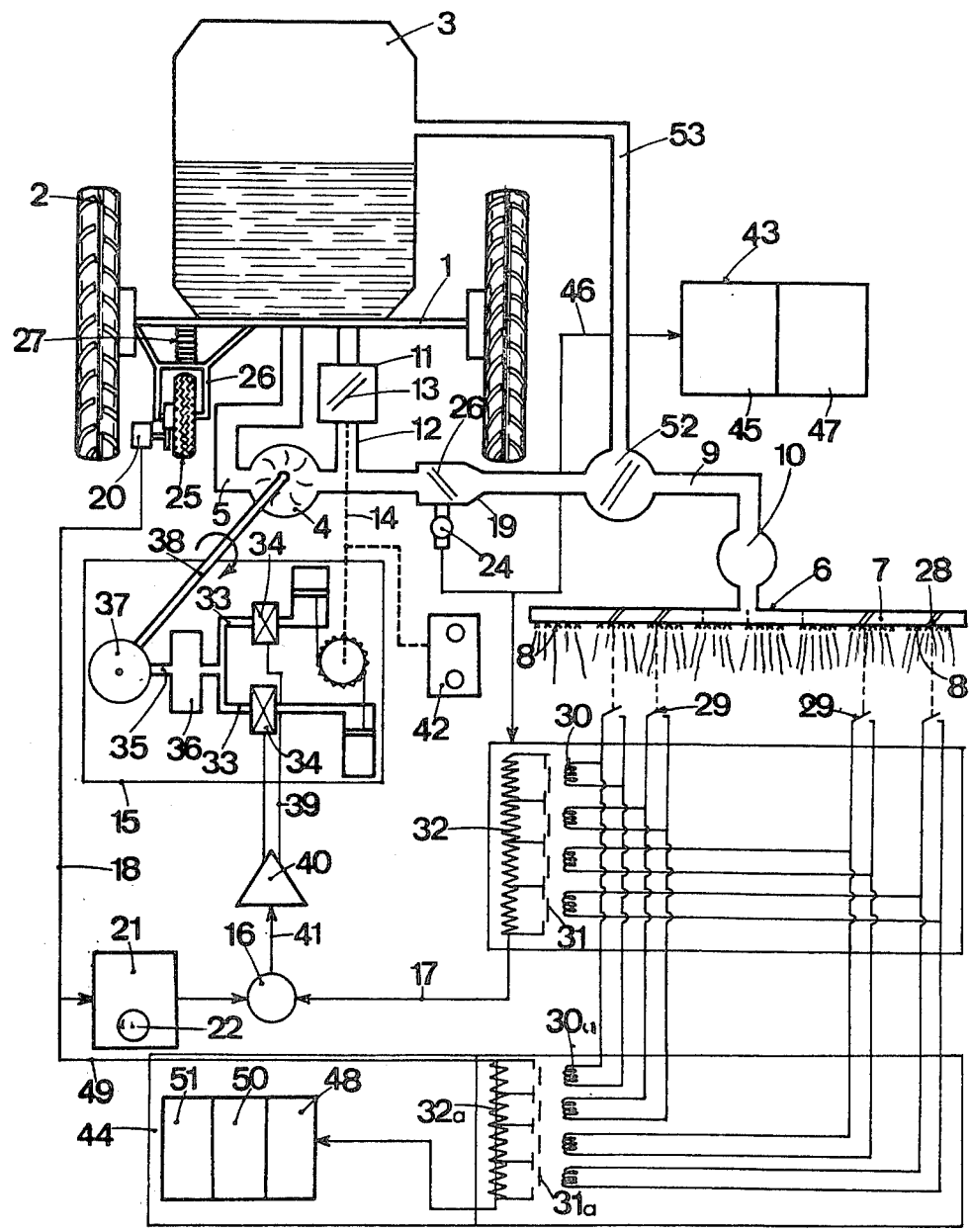

LIQUID DISTRIBUTING APPARATUS AND IN PARTICULAR A FERTILIZER OR INSECTICIDE SPRAYER

The present invention relates generally to mobile liquid distributing apparatus and in particular apparatus for spraying or spreading fertilizer or insecticide mounted on agricultural machines which are equipped with devices for regulating the flow so as to ensure a constant flow of liquid per unit area to be covered irrespective of the speed of displacement of the apparatus, this constant flow being possibly different, depending on the product to be distributed.

The invention relates more particularly to apparatus of the type comprising a quasi-constant flow supply device, a variable flow distributing device, liquid transfer means interconnecting said two devices, flow regulating means included in said transfer means and a regulation device acting on said regulating means and comprising comparison means which receive, on one hand, a signal from means measuring a magnitude which is characteristic of the flow of liquid in the transfer means, and, on the other hand, a reference signal from means for measuring the speed of the apparatus through means for transformation between the speed and said magnitude.

The supply device generally comprises a tank, and a quasi-constant flow pump and the distributing device comprises one or a plurality of ejecting means such as nozzles disposed, for example, on distributing system in one or more sections, whereas the transfer means comprise generally piping possibly having a header inserted therein, in the down stream part thereof. The flow regulating means generally comprises a valve inserted either in the transfer means, or one of the two branches of said transfer means, or in return means, for example piping, for returning liquid to the tank and located upstream of said transfer means, and it is generally driven by the comparison means through a motor provided with a servomechanism.

The comparison means of the regulation device act on the means regulating the flow in the direction for increasing or decreasing the flow, depending on the sign of their output signals. Said comparison means are preferably electrical and the same is true of the transformation means which may be of the analog or the digital type.

Apparatus of this type are known, for example from French Pat. No. 74 12,009 in which the magnitude characteristic of the flow of the liquid is constituted by the pressure of the latter, measured for example in the header. It therefore concerns here a regulation of the flow which is indirect and it has been found that its cost-precision ratio, although of interest, is not optimum.

An object of the present invention is to provide an apparatus which gives essentially an improved cost-precision ratio and is moreover cheaper and simpler and particularly well adapted to the special conditions of agriculture.

According to the invention, there is provided an apparatus of the aforementioned type, wherein the means measuring the magnitude characteristic of the flow is constituted by a flow measuring means and the transformation means are constituted by means for applying a coefficient of proportionality.

Bearing in mind that the width of the area swept over by the ejection means or by each section of the distributing system is know, this coefficient may correspond, for a given product to be distributed, to a volume per unit area and per ejecting means or distributing system section.

In the case where ejection means are provided which are arranged in a plurality of sections some of which may be put out of service, there may be provided in a particularly advantageous manner in the path of the measured flow signal, dividing means which reduce the signal in accordance with the number of sections in service.

The improved precision achieved by the regulation device employed renders more sensitive an error which is normally small due to the fact that, if the speed measuring means is mounted, as on known apparatus, on a non-driving but a supporting wheel, the real diameter of the wheel, and consequently the measured speed, would depend on the inflation of this wheel and on the quantity of product remaining in the tank. This is why, according to the invention, it is arranged in order to eliminate this error to place the speed measuring means on an auxiliary non-driving and non-supporting wheel which is for example drawn along by the apparatus.

In order to obtain a correct regulation, it is moreover necessary that the regulating means be located in a zone of action so that the apparatus may comprise preferably a safety device indicating any blocking of the regulating means.

The apparatus may also comprise advantageously flow and surface totalizing devices whereby it is possible to check at will the situation of the spreading in due course.

In order to permit a stoppage of the spreading when the machine makes a half-turn at the end of the row covered, a bypass valve may be advantageously inserted in the transfer means and connected in the return to the tank, which presents the high interest of maintaining during this half-turn the flow at the preceding value and resuming the spreading on a new row with no need for the regulation device to bring about a large variation in this flow.

A spraying or spreading apparatus according to the invention is shown diagrammatically, by way of a non-limitive example, in the single accompanying FIGURE.

This apparatus is disposed on an agricultural machine comprising a main chassis 1 mounted on wheels 2. The apparatus comprises, disposed on this chassis, a quasi-constant flow supply device constituted by a tank 3 for the liquid to be sprayed or spread and a quasi-constant flow pump 4 which is connected by piping 5 to a variable flow distributing device constituted by an elongated distributing system 6 comprising for example 4, 6 or 8 sections 7, each of which sections combines 4, 6 or 8 ejection means or nozzles 8, liquid transfer means connecting the output of the pump 4 to the input of the system 6 and constituted by piping 9 in the downstream part of which piping a header 10 is disposed.

The apparatus further comprises a regulation device comprising a flow regulating means existing in the piping 9 and constituted by a regulator valve 11 inserted in a piping 12 for returning liquid to the tank and connected to the piping 9 downstream of the pump 4 but in the upstream part of this piping 9, the closure member 13 of this valve being driven through a mechanical connection 14 by a regulation assembly comprising a motor controlled by the speed of the machine owing to the provision of comparison means or a comparator 16.

The comparator 16 comprises two input lines 17 and 18, the first of which lines is connected to means measuring the flow in the piping 9 and constituted by a flow-meter 19 inserted in this piping, and the second of which lines is connected to means for measuring the speed of the apparatus or speed sensor 20 through speed-flow transforming means 21 provided with setting means 22, the line 17 consequently furnishing to the comparator a measured flow signal and the line 18 a reference or command flow signal from which the comparator produces the signals controlling the motor 15.

The flow-meter 19 is in a particularly advantageous manner constituted by a flow-meter having a moving blade 26, the movement of which blade, produced by the speed of the liquid passing through the apparatus, represents an image or a function of the flow of the liquid. Any possible non-linearity of this function may be corrected, for example by means of a connecting rod-crank mechanism or any other non-linear transmission mechanism. In this flow-meter this blade must be contained in a tube which is at least conical so as to be able to operate in accordance with the principle of a rotameter. This apparatus is particularly strong and its output torque is relatively very high, bearing in mind that the blade may have a sectional area of several square centimeters which renders it extremely well adapted to utilization in the agricultural field. At the output thereof there is arranged a torque transducer 24, converting the torque into voltage or current, the assembly thus constituting an electrical flow-meter which delivers an output signal the current of which is proportional to the flow of the liquid which flows therethrough.

This flow-meter could also be constituted by any other flow measuring apparatus such as a displacement apparatus of the type having an axial propeller which delivers electric pulses the number of which is proportional to the flow, or an apparatus of the type having a tangent wheel also delivering a number of pulses proportional to the flow, or an apparatus employing the differential pressure measured across a Venturi.

The speed sensor 20 is preferably constituted by a tachometric dynamo which is keyed on an auxiliary wheel 25 which is a non-driving and non-carrying wheel and is drawn along by the main chassis 1 and is, for example, mounted on a secondary chassis 26 which is pivoted to the first chassis and connected to the latter by a compensating spring 27 which maintains the pressure exerted by the wheel on the ground constant. This dynamo delivers a current signal the intensity of which is proportionate to the speed of the wheel 25 and consequently to the exact speed of displacement of the machine.

The speed-flow transforming means 21 are constituted by means for applying a coefficient of proportionality, such as a potentiometer the slide of which is shifted by the setting means 22 constituted for example by a knob. The coefficient set corresponds to the amount of liquid to be spread per unit area and per distributing system section for a given speed of the machine, for example for a real speed of the order of 10 kilometers per hour, the scale of the setting means having moreover been fixed by a prior ganging. The amount of liquid to be spread is of course known from the type of nozzles employed and from the number of the latter per section of the distributing system. Thus for a speed "v" expressed in kilometers per hour, the current signal issuing from the potentiometer translates the flow, for examples in liters, per unit area and per section of the distributing system, by applying the following equation:

$$D = k.v.$$

This value therefore constitutes the desired flow that the spraying apparatus must provide for a given speed of displacement. There could also be employed in a particularly advantageous manner digital coded wheels or devices reading badges or perforated cards.

The different sections 7 of the system 6 are separated by opening-closing means 28 whereby it is possible, before a spreading operation, to put 4,6 or 8 sections in service, the piping 9 communicating with the central part of the system 6 so as to supply liquid to at least the four central sections of the system. Coupled to each of the four opening-closing means 28 is an electric switch 29 which closes or opens the supply circuit of the coil 30 of a relay. The armatures 31 of the four relays are connected in parallel respectively to four sections of a resistor 32 inserted in the line 17 connecting the flow-meter 19 to the comparator 16, the assembly just described constituting dividing means which reduce the signal transmitted by this line in accordance with the number of sections of the system 6 in service. In this way, the intensity of the current signal entering the comparator corresponds to the real flow of liquid spread per section of the distributing system.

The motor 15 driving the valve is constituted by a pneumatic motor having two cylinders mounted in the flat-twin manner and supplied with compressed air by two pipings 33 in which electrically-operated valves 34 are inserted and which are connected, through a single piping 35 in which a compound air reserve 36 is inserted, to an air compressor 37 which is driven in the same way as the shaft of the pump 4 by the driving power take-off 38 with which the tractor machine is equipped. The two piston rods drive in opposite directions gearing of the connection 14 to the valve 11. The electrically operated valves 34 are electrically connected by lines 39 to the output of an electric amplifier 40 which provides a suitable amplification of voltage and power to permit the actuation of the valve 11 by means of the motor 15, the input of which amplifier is connected by a line 41 to the output of the comparator 16. The amplifier could also be pneumatic or hydraulic, the motor could be electric or hydraulic and the assembly could result from a combination of these different techniques.

The apparatus further comprises a safety device 42 whereby the fully-open or the fully-closed position of the valve 11 may be indicated on two indicators owing, for example, to two end-of-travel switches which are mechanically connected to the drive of the valve and electrically connected to the indicators. In this way the valve cannot be in a blocked position (fully open or fully closed), that is to say, outside its zone of action, without a signal of this situation being produced.

For the purpose of supervising the spreading operation, there are provided a total flow counting device 43 and a total area counting device 44. The flow counting device 43 is for example constituted by a current-frequency converter 45 connected by a line 46 to the output of the blade-type flow-meter 19 and a pulse counter 47 connected to this converter so that it furnishes an integration of the liquid flow and enables the total amount of liquid sprayed to be known at any moment. In this case of a flow-meter having a propeller which provides "pips", the converter is unnecessary and the counter is directly connected to the output of this flow-meter.

The total area counting device 44 is for example constituted by a current-frequency converter 48 connected by a line 49 to the output of the tachometric dynamo 20, a pulse counter connected to this converter, and means for dividing the signal in accordance with the number of sections of the distributing system in service, similar to those previously described, with a resistor 32a connected to the line 49 and four relays 30a–31a controlled by the same switches 29 coupled to the means 28 putting the sections of the distributing system in service. The pulse counter 50 furnishes the distance d travelled through (an integral of the speed) and a multiplying means 51, such as a potentiometer in which the number of sections n and the width 1 of each section is impressed, furnishes the value of the total area in which the liquid has been sprayed, in accordance with the equation:

$$S = n.l.d.$$

In the case of a speed sensor keyed on a wheel in such manner as to furnish "pips" for each rotation of the wheel, the converter is unnecessary and the counter is directly connected to the dividing means. In the above formula, n indicates the number of sections, l indicates the width of each section, d represents the distance travelled, and S equals the value of the total area in which the liquid has been sprayed.

Provided in the piping 9 between the flow-meter 19 and the header chamber 10 is a by-pass valve or a three-way valve 52 the second outlet of which is connected to the tank 3 by a return piping 53.

The regulation is carried out in the following manner:

The operator puts into service the desired number of sections of the distributing system by the means 28, then starts up the machine so that the power take-off 38 drives the pump 4 and the compressor 37. The tachometric dynamo 20 detects on the wheel 25 the speed of displacement and sends a current signal that the means 21 convert into a command or reference signal representing the flow to comply with at this speed. The flow-meter 19 detects the real flow and sends out a signal which, after correction in the dividing unit 30-31-32, translates the real flow per section of distributing section. The difference between the two signals is sent by the comparator 16 to the amplifier which, depending on the sign of this difference, controls the opening of either of the two electrically-operated valves 34 which actuates either of the piston rods of the motor and, consequently, moves the closure member of the valve 11 in the direction for opening or closing. As soon as a balance has been obtained, this action thus returns the flow to the required value corresponding to the actual speed of the machine. Two valves are provided, and these include a slow regulating means or device 11, and a by-pass valve 52.

What is claimed is:

1. A mobile liquid distributing apparatus comprising a quasi-constant flow supply device, a variable flow distributing device, liquid transfer means interconnecting said two devices, a flow regulating means included in said transfer means, a regulation device acting on said regulating means and comprising comparison means, means for measuring magnitude which is a characteristic of the flow of liquid in said transfer means and emitting a first signal, means for measuring the speed of the apparatus and emitting a reference signal, means for transforming between the speed measuring means and said comparison means, said comparison means being connected to receive said first signal and said reference signal through said transforming means, said means measuring the characteristic magnitude comprising a flow measuring means, and said transforming means comprising means applying a coefficient of proportionality, said variable flow distributing device comprising ejecting means arranged in a plurality of sections, some of said sections being capable of being put out of service, dividing means provided between the flow measuring means, and the comparison means for reducing the first signal in accordance with the number of said sections in service, said dividing means comprising means for selectively putting said ejecting means sections in service, switches coupled with said means for putting said ejecting means sections in service, a resistor having sections, relays having coils and armatures, said armatures being combined with said resistor sections in parallel, and means for supplying current to said coils through said switches.

2. The structure as defined in claim 1 wherein the apparatus comprises a total area counting device, comprising a pulse counter unit, a current frequency converter and second dividing means, said second dividing means for reducing the signal as a function of the number of sections in service and comprising a second resistor having sections and second relays having coils and armatures, said armatures being combined in parallel with said resistor sections, and means for supplying current to said coils through said switches.

* * * * *